United States Patent
Lang et al.

(10) Patent No.: US 10,763,911 B1
(45) Date of Patent: Sep. 1, 2020

(54) PROTECTIVE COVERING FOR AN ELECTRONIC DEVICE

(71) Applicant: Open Mind Developments Corporation, Kelowna (CA)

(72) Inventors: Jeremy Lang, Saskatoon (CA); Raymond Leung, Chai Wan (HK)

(73) Assignee: Open Mind Developments Corporation (CA)

( * ) Notice: Subject to any disclaimer, the term of this patent is extended or adjusted under 35 U.S.C. 154(b) by 0 days.

(21) Appl. No.: 16/839,224

(22) Filed: Apr. 3, 2020

(51) Int. Cl.
| | |
|---|---|
| A45C 11/00 | (2006.01) |
| H04B 1/3888 | (2015.01) |
| B29C 45/14 | (2006.01) |
| H04M 1/18 | (2006.01) |
| B29L 31/00 | (2006.01) |

(52) U.S. Cl.
CPC ............ *H04B 1/3888* (2013.01); *A45C 11/00* (2013.01); *B29C 45/14336* (2013.01); *H04M 1/185* (2013.01); *A45C 2011/002* (2013.01); *A45C 2200/10* (2013.01); *B29K 2995/006* (2013.01); *B29K 2995/0026* (2013.01); *B29L 2031/768* (2013.01)

(58) Field of Classification Search
CPC .............................. H04B 1/3888; A45C 11/00
See application file for complete search history.

(56) References Cited

U.S. PATENT DOCUMENTS

| | | |
|---|---|---|
| D380,477 S | 7/1997 | Williams et al. |
| 6,046,251 A * | 4/2000 | Kawakami .......... B29C 45/0001 523/105 |
| 8,603,636 B2 | 12/2013 | Kani et al. |
| 9,193,866 B2 | 11/2015 | Topoulos |
| 9,438,295 B1 | 9/2016 | Song |
| D775,614 S | 1/2017 | Kim et al. |
| D781,836 S | 3/2017 | Kim et al. |

(Continued)

FOREIGN PATENT DOCUMENTS

| WO | 2015060529 | 4/2015 |
|---|---|---|

OTHER PUBLICATIONS

Trident Apple iPhone 7 Plus Krios Dual Case” walmart.com (Accessed Jan. 30, 2020).

(Continued)

*Primary Examiner* — Tuan H Nguyen
(74) *Attorney, Agent, or Firm* — Adam K. Sacharoff; Much Shelist, P.C.

(57) ABSTRACT

In one embodiment there is provided a protective case for an electronic device. The case has a substantially transparent planar back surface. The substantially transparent planar back surface is made from a compostable biopolymer material configured to form a rigid back surface and wherein the substantially transparent planar back surface has a terminal outer periphery edge. An outer bumper formed into a continuous side wall extends transversely from the planar back surface. The continuous side wall has an inwardly extending edge such that the outer bumper is configured to form fit around an electronic device. The outer bumper is made from a compostable biopolymer material configured to form into the outer bumper that is softer then the rigid back surface, and wherein the outer periphery edge of the transparent planar back surface is over-molded into the outer bumper.

8 Claims, 5 Drawing Sheets

(56) References Cited

U.S. PATENT DOCUMENTS

| | | |
|---|---|---|
| D808,376 S | 1/2018 | Kim |
| D820,819 S | 6/2018 | Kim |
| D823,298 S | 7/2018 | Kim et al. |
| 10,027,363 B2 | 7/2018 | Hsu |
| D829,201 S | 9/2018 | Kim et al. |
| D839,256 S | 1/2019 | Kim et al. |
| D839,859 S | 2/2019 | Zhang |
| 10,194,723 B2 | 2/2019 | Skepton |
| 10,266,696 B2 | 4/2019 | Kim et al. |
| D851,080 S | 6/2019 | Wei |
| D851,082 S | 6/2019 | Fitzgerald et al. |
| D855,610 S | 8/2019 | Wei |
| 10,398,204 B1 | 9/2019 | Morgan |
| 2003/0012371 A1 | 1/2003 | Weinstock et al. |
| 2008/0121541 A1 | 5/2008 | Clark |
| 2011/0283443 A1 | 11/2011 | Simpson |
| 2011/0319525 A1* | 12/2011 | Maeda ............... C08L 71/00 523/452 |
| 2012/0012579 A1 | 1/2012 | Kaplancali |
| 2016/0187937 A1 | 6/2016 | Ahee et al. |
| 2019/0367254 A1 | 12/2019 | Yancy |

OTHER PUBLICATIONS

Biodegradable Wheat Straw Acrylic and TPU Bumper Transparent Phone Case” duoyinfo.com (Accessed Jan. 30, 2020).

Innovez Eco-friendly Biodegradable iPhone Case” gadgets.com (Sep. 9, 2010).

Biodegradable Soft Case for IPhone 11 Pro hybrid 2in1 wheat straw pc+tpu Compostable Eco-Friendly Skin Cover” dhgate.com (Accessed Jan. 30, 2020).

For Huawei P30—Kivik Cover” mykrusell.com (Accessed Jan. 30, 2020).

* cited by examiner

PROTECTIVE COVERING FOR AN ELECTRONIC DEVICE

FIELD OF THE INVENTION

The present invention relates to protective coverings for an electronic device and more particularly to a clear compostable biopolymer case and the method of manufacturing the same.

BACKGROUND OF THE INVENTION

A wide variety of different types and designs of cases for portable electronic devices are known. One problem with existing device cases is that the cases are not being made entirely from compostable biopolymer materials. One of the major reasons is that typically compostable biopolymer materials are difficult to manufacture as a clear material, as clear bio resins are often very brittle and thus cannot serve as a protective phone case. Thus, clear cases are often made of a conventional plastic that is capable of sustaining drop tests.

Therefore, there is a need for a cellular phone case made entirely from compostable biopolymer materials and that include a clear transparent front face and side soft edges.

SUMMARY OF THE INVENTION

In one embodiment of the present invention there is provided a protective case for an electronic device. The case has a substantially transparent planar back surface. The substantially transparent planar back surface is made from a compostable biopolymer material configured to form a rigid back surface and wherein the substantially transparent planar back surface has a terminal outer periphery edge. The case also has an outer bumper formed into a continuous side wall extending transversely from the planar back surface. The continuous side wall has an inwardly extending edge such that the outer bumper is configured to form fit around an electronic device. The outer bumper is also made from a compostable biopolymer material configured to form into the outer bumper and which is softer then the rigid back surface. In addition, the outer periphery edge of the transparent planar back surface is over-molded into the outer bumper.

In another embodiment of the invention, the case is made with similar materials but created into two halves to fit around the entire electronic device.

The invention also outlines a method of manufacturing a protective case for an electronic device. The method uses the steps of injection molding a compostable biopolymer material into a substantially transparent planar back surface that is configured into a rigid back surface. The substantially transparent planar back surface is configured with a terminal outer periphery edge. The method then uses over-molding of the entire terminal outer periphery edge with a compostable biopolymer material that is softer then the rigid back surface. This forms the softer compostable biopolymer material into an outer bumper that is configured into a continuous side wall extending transversely from the planar back surface. The continuous side walls having an inwardly extending edge such that the outer bumper is configured to form fit around an electronic device.

In the aforementioned embodiments, the planar surface is a clear material and the outer bumper is an opaque material. In yet other aspects of the invention, the planar surface is made from 100% compostable biopolymer material and is configured with an Elastic Modulus: 3.0-3.5 GPa and a Tensile Strength: 50-60 MPa, while the softer outer bumper is made from 100% compostable elastomeric bioplastic material and is configured with an about 4-5 MPa, and a Tensile Strength between 8 and 10 MPa. In yet other embodiments, the outer bumper is preferably 100% compostable elastomeric bioplastic material and is configured with about 4.4 MPa, and a Tensile Strength of about 9.4 MPa.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DETAILED DESCRIPTION OF THE DRAWINGS

Figure 1A:
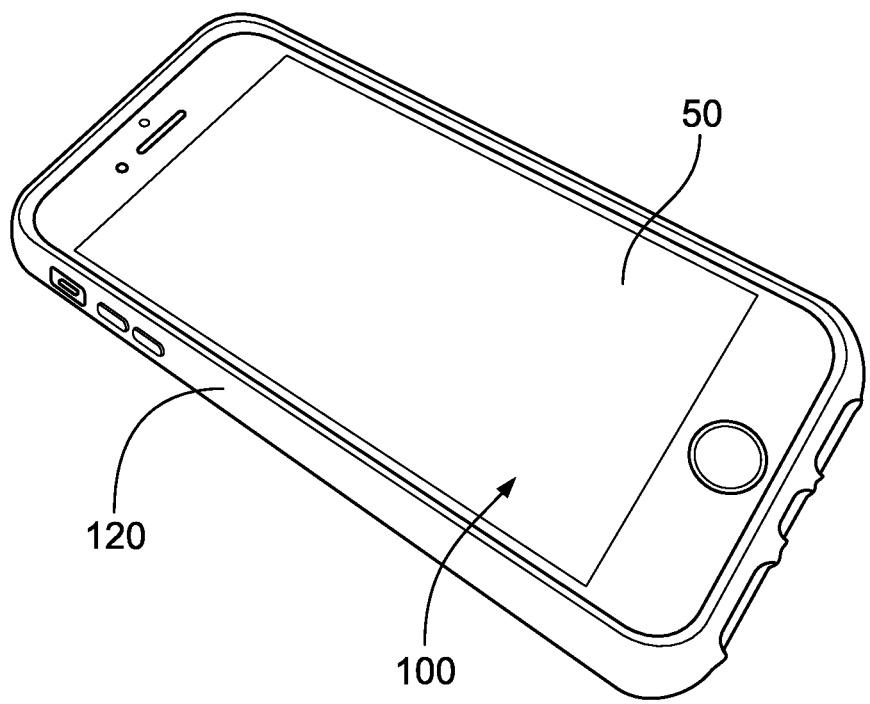
FIG. 1A is a perspective view of the front of a case in accordance with an embodiment of the present invention.

While the invention is susceptible to embodiments in many different forms, there are shown in the drawings and will be described in detail herein the preferred embodiments of the present invention. It should be understood, however, that the present disclosure is to be considered an exemplification of the principles of the invention and is not intended to limit the spirit or scope of the invention and/or claims of the embodiments illustrated.

Figure 1B:
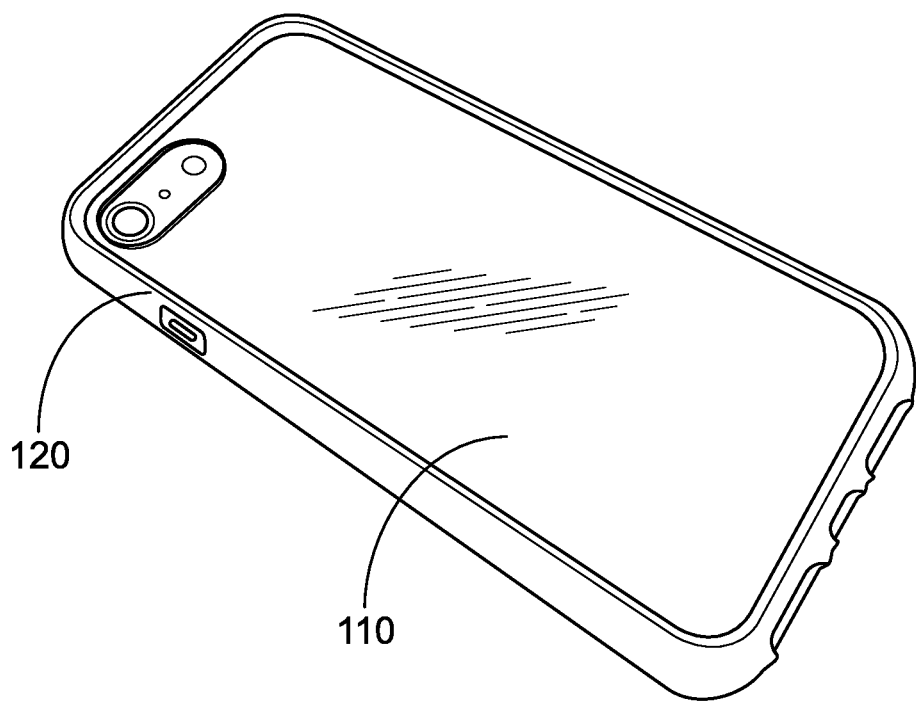
FIG. 1B is a perspective view of the back of a case in accordance with an embodiment of the present invention.
Figure 2:
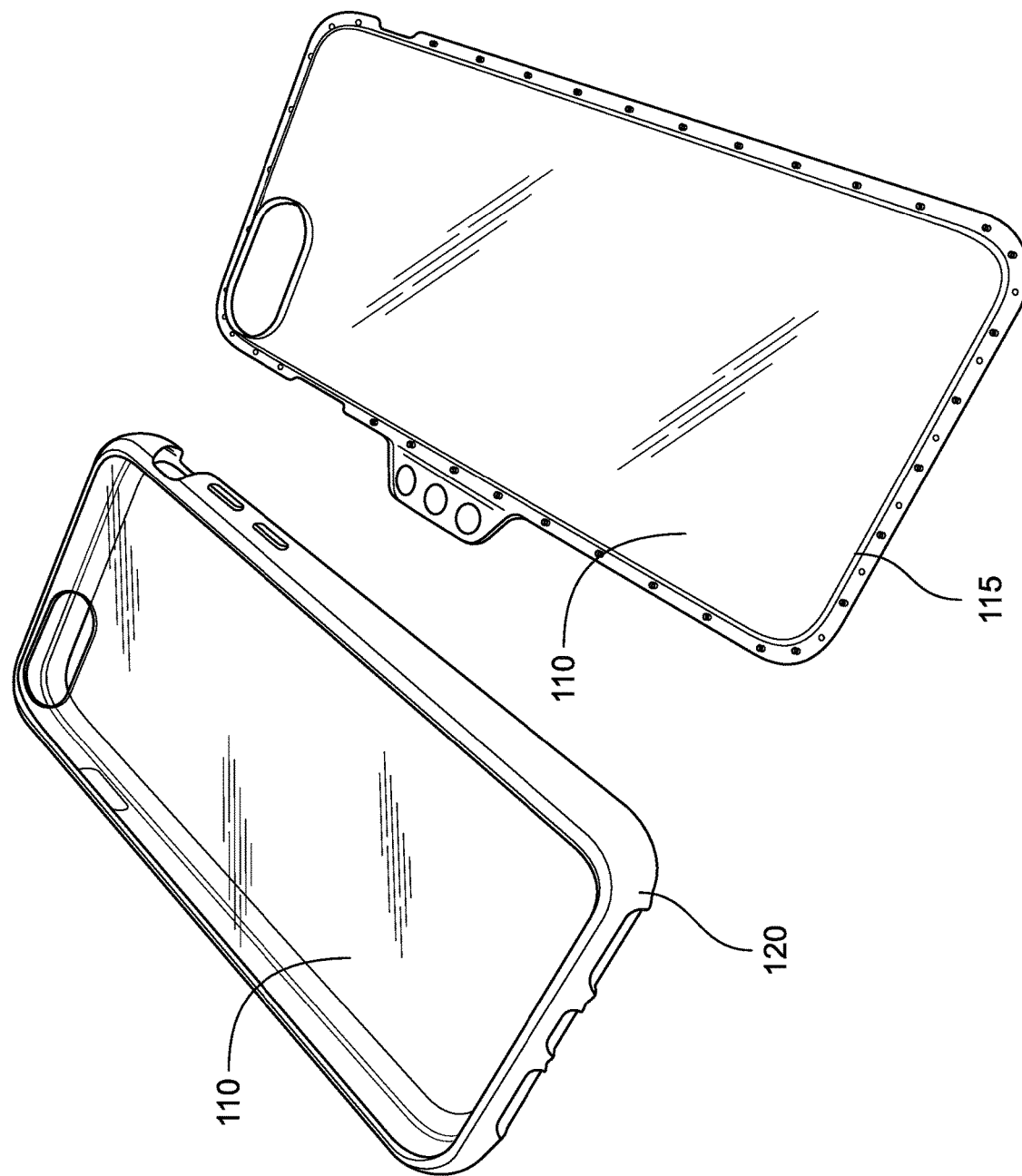
FIG. 2 is a perspective view of the components of a case in accordance with an embodiment of the present invention.
Figure 3:
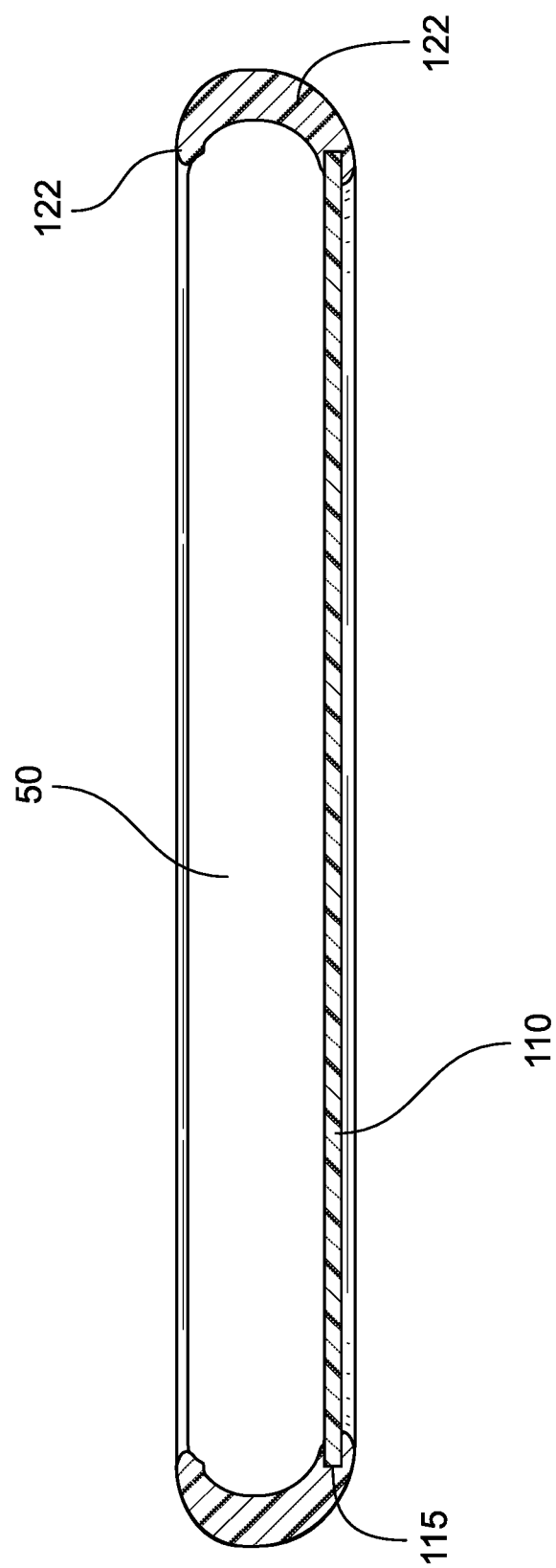
FIG. 3 is a cross section view of a case in accordance with an embodiment of the present invention.
Figure 4:
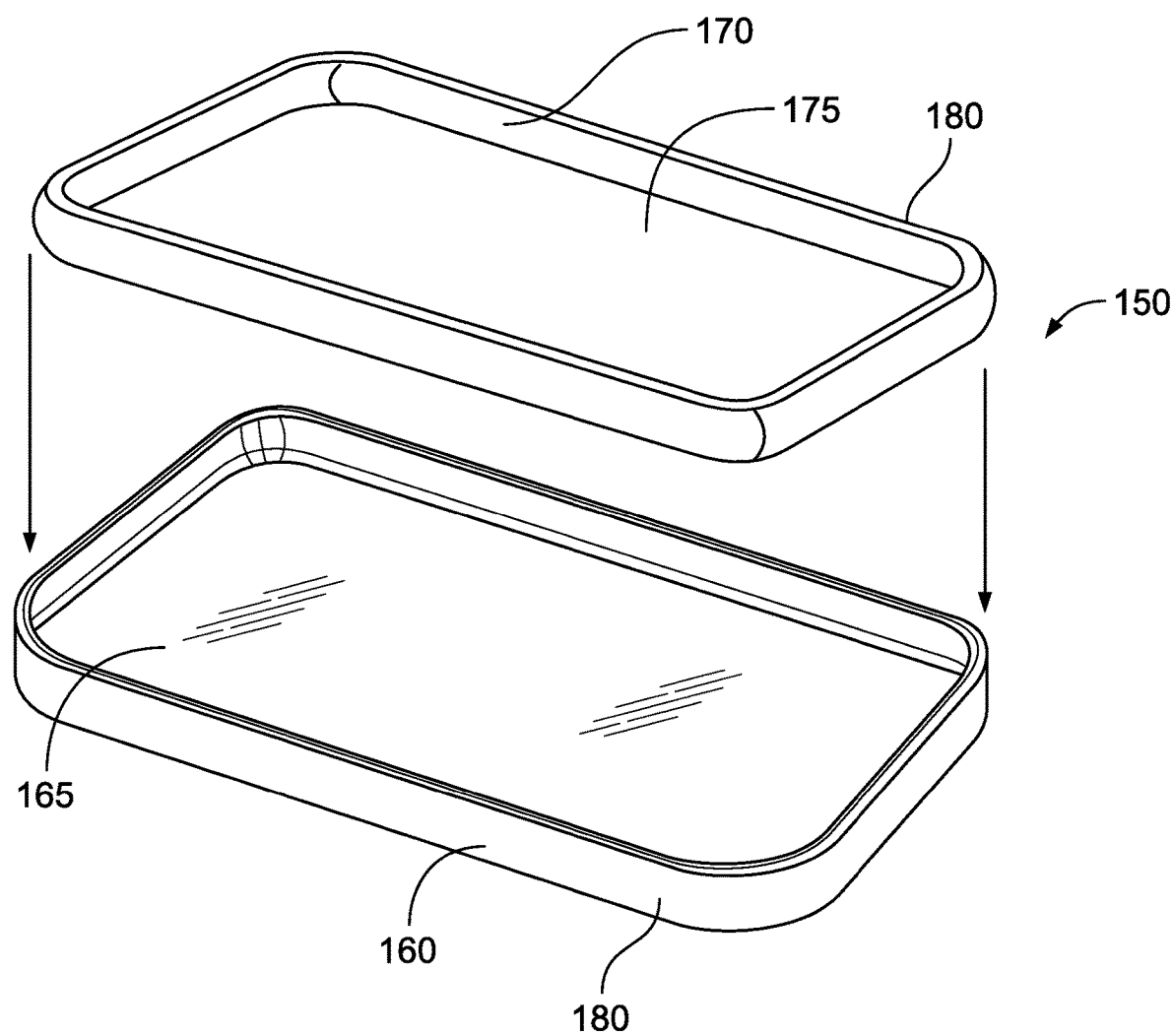
FIG. 4 is a perspective exploded view of components of a case in accordance with another embodiment of the present invention.
Figure 5:
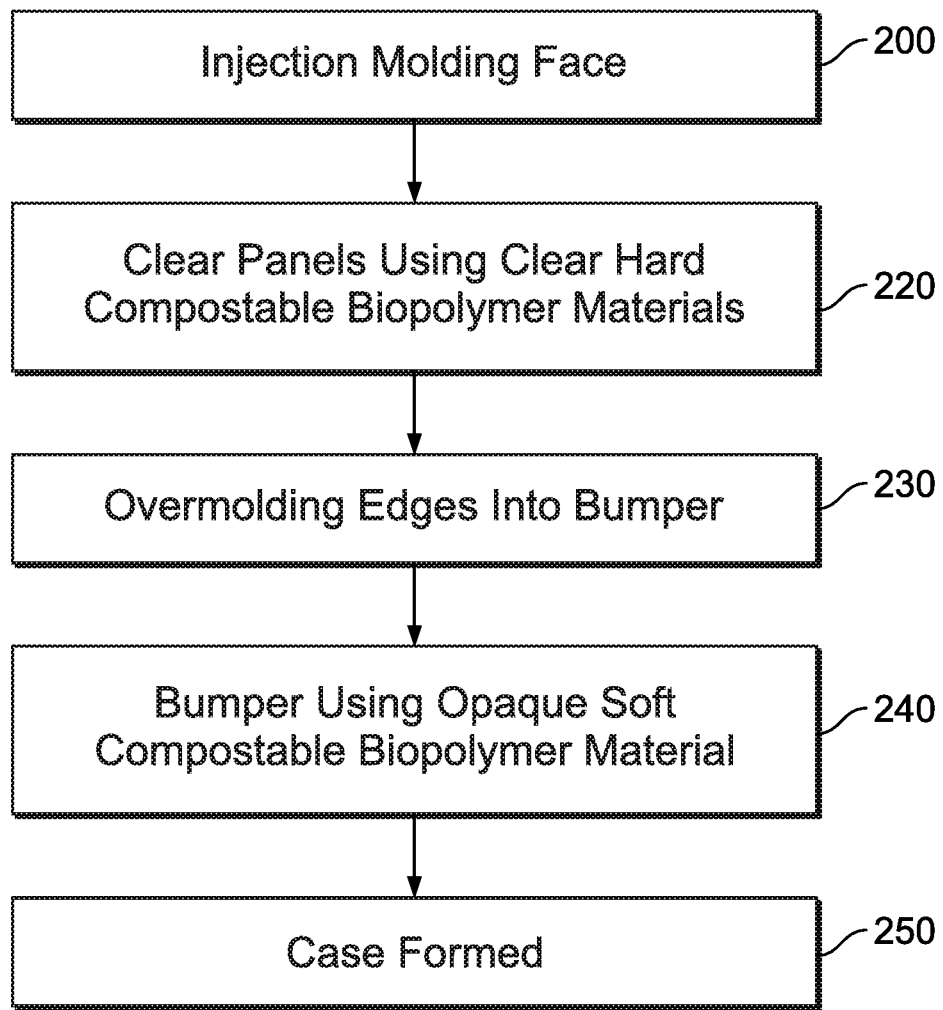
FIG. 5 is a flow chart of a method of manufacturing a case in accordance with an embodiment of the present invention.

Referring now to FIGS. 1A-5, there is provided a case 100 for use with a cell phone 50, or other type of electronic device. The case 100 formed with a clear back face 110 and side bumper 120. The case 100 in this embodiment does not include a front face, leaving the case open directly to the electronic device 50. The case 100 has a clear and transparent back face 110 with an outer periphery terminal edge 115. The face is made from a clear hard compostable biopolymer material. The face 110 and periphery terminal edge 115 is then completely over-molded into the side bumper 120. Therefore, the side bumper 120 entirely encapsulates the outer periphery terminal edge 115. The side bumper is made of a compostable biopolymer material that is softer then the clear hard compostable biopolymer material used for the face 110. As such the side bumper protects the electronic device and face from accidentally dropping the electronic device onto a surface. The side bumper has an inwardly extending edge such that the outer bumper is configured to form fit around an electronic device. The side bumper may be any color or design.

As outlined by one or more embodiments, the substantially transparent planar back surface 110 is made from a compostable biopolymer material configured to form a rigid back surface and wherein the substantially transparent planar back surface has a terminal outer periphery edge 115.

The case also has an outer bumper 120 formed into a continuous side wall extending transversely from the planar back rigid surface. The continuous side wall has an inwardly extending edge 122 such that the outer bumper is configured to form fit around an electronic device. The outer bumper is also made from a compostable biopolymer material configured to form into the outer bumper and which is softer then the rigid back surface. In addition, the outer periphery edge of the transparent planar back surface is over-molded into the outer bumper.

The case 100 is 100% entirely manufactured from compostable biopolymer materials. The face 110 is manufactured from a clear hard compostable biopolymer material, while the bumper 120 is made of a softer compostable biopolymer material.

The hard-compostable material used to create the clear face is transparent and too rigid to flex around the outside of the case and too rigid to provide adequate protection without cracking. There are currently no soft, clear, transparent compostable biopolymers on the market able to function as an adequate bumper, so a soft opaque compostable biopolymer is required as a functional bumper. The soft opaque compostable biopolymer bumper is too flexible to be used by itself as a bumper as it will not adequately stay on the phone to function and provide protection. The hard-compostable biopolymer provides the stiffness and strength required to hold the soft bumper in place. Combining soft and hard compostable biopolymers with different molecular structures and getting them to bond in a functional way is part of the novelty of the invention.

As defined by one or more embodiments of the invention, the transparent hard compostable biopolymer material used for the clear face of the case, is 100% bio-based polymer designed to form covalent bonds to all sorts of natural fibers and materials, the hard-compostable biopolymer material has an Elastic Modulus: 3.0-3.5 GPa and a Tensile Strength: 50-60 MPa. In contrast, the opaque soft compostable biopolymer material for the bumper is about 30-40%, preferably 35%, bio-based (i.e. wheat starch, corn starch, flax chive) elastomeric bioplastic, with an Elastic Modulus of about 4-5, preferably 4.4 MPa, and a Tensile Strength between 8 and 10, and preferably 9.4 MPa.

In another embodiment there is a case 150 formed from front 160 and back 170 case halves. The case 150 has a clear and transparent front face 165, which may or may not also have a clear transparent rear face 175. The front and/or rear faces 165, 175 are made from a clear hard compostable biopolymer material. The faces 165, 175 are over-molded with bumper edges 180 made of a softer compostable biopolymer material, which forms each of the halves. The halves typically snap fit into place to form around an electronic device, such as a phone, as a case. The bumper edges are typically a solid color. The case 150 is made in accordance with previous embodiments and is thus 100% entirely manufactured from compostable biopolymer materials.

The cellular phone case 100 is manufactured by injection molding the faces (Box 200) by using the clear hard compostable biopolymer material to form the clear panels (Box 220). The injection molding step uses a temperature range of about 155° C. to about 170° C. and a pressure range of about 60-90 KPa followed by a cool down period of about 15-20 seconds. The face(s) is then over-molded (Box 230) by injection molding the soft compostable biopolymer material over the edges of the face to form the bumper sides (Box 240) and thus either forming the case (in the first embodiment) or the front or back halves (in the second embodiment) (Box 250) of the cellular phone case 100. The over-molding injection step uses a temperature range of about 150° C.-170° C. and a pressure range of about 40 KPa-75 KPa followed by a cool down period of about 30-40 seconds.

The cellular case can also be manufactured in a secondary method. Hard compostable biopolymer raw material is extruded to form clear compostable biopolymer sheets. Laser cutting is used to form the faces from the sheets. The soft bumper edges are molded over the terminal side edges of the faces by injection molding soft compostable biopolymer material to form the case or the halves of the case.

From the foregoing and as mentioned above, it is observed that numerous variations and modifications may be effected without departing from the spirit and scope of the novel concept of the invention. It is to be understood that no limitation with respect to the embodiments illustrated herein is intended or should be inferred. It is intended to cover, by the appended claims, all such modifications within the scope of the appended claims.

We claim:

1. A method of manufacturing a protective case for an electronic device comprising: providing a first compostable biopolymer material that is substantially transparent; providing a second compostable biopolymer material that is softer then the first compostable biopolymer material and that is substantially opaque; injection molding the first compostable biopolymer material and forming the first compostable biopolymer material into a substantially rigid transparent planar back surface defined as a portion of the protective case, and further forming a terminal outer periphery edge around the rigid transparent planar back surface; over-molding all of the terminal outer periphery edge, of the rigid transparent back surface, with the second compostable biopolymer material; and forming the second compostable biopolymer material into a continuous side wall extending transversely from the terminal outer periphery edge of the rigid transparent planar back surface to form an outer bumper, which is further defined as a portion of the protective case and that is softer then the rigid transparent back surface, whereby the protective case for an electronic device is entirely manufactured from compostable biopolymer material.

2. The method of claim 1, wherein the planar back surface is made from 100% compostable biopolymer material and is configured with an Elastic Modulus between: 3.0-3.5 GPa and a Tensile Strength between: 50-60 MPa.

3. The method of claim 1, wherein the outer bumper is made from 100% compostable elastomeric bioplastic material and is configured with an Elastic Modulus between 4-5 MPa, and a Tensile Strength between 8 and 10 MPa.

4. The method of claim 3, wherein the outer bumper is preferably 100% compostable elastomeric bioplastic material and is configured with the Elastic Modulus of about 4.4 MPa, and a Tensile Strength of about 9.4 MPa.

5. The method of claim 4 further comprising the step of configuring the outer bumper with an inwardly extending edge such that the outer bumper is configured to form fit around an electronic device.

6. The method of claim 4 further comprising:
forming the outer bumper into a first half of the protective case; and
forming a second half of the protective case configured to connect to the first half of the protective case to define the protective case.

7. The method of claim 6 wherein the second half is manufactured in the same steps as the first half of the protective case such that it includes a substantially transparent planar front surface that is configured into a rigid front surface, and wherein the substantially transparent planar front surface has a terminal outer periphery edge and over-molding the entire terminal outer periphery edge with a compostable biopolymer material that is softer then the rigid front surface, and forming the softer compostable biopolymer material into an outer bumper configured into a continuous side wall extending transversely from the planar front surface.

8. The method of claim 7 wherein the first and second halves of the protective case work in concert to secure together to form the protective case around the electronic device.

\* \* \* \* \*